(12) United States Patent
Al-Khalifa et al.

(10) Patent No.: US 11,030,912 B2
(45) Date of Patent: Jun. 8, 2021

(54) INTERACTIVE ARABIC ALPHABET BLOCKS

(71) Applicant: KING SAUD UNIVERSITY, Riyadh (SA)

(72) Inventors: Hend Suliaman Al-Khalifa, Riyadh (SA); Sara Al-Siyat, Riyadh (SA); Maram Al-Harthi, Riyadh (SA); Fajer Al-Bakiri, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/137,458

(22) Filed: Sep. 20, 2018

(65) Prior Publication Data

US 2020/0098279 A1  Mar. 26, 2020

(51) Int. Cl.
| | | |
|---|---|---|
| G09B 19/06 | (2006.01) | |
| G09B 5/06 | (2006.01) | |
| A63F 9/12 | (2006.01) | |

(52) U.S. Cl.
CPC ............ *G09B 5/065* (2013.01); *A63F 9/1204* (2013.01); *G09B 19/06* (2013.01)

(58) Field of Classification Search
None
See application file for complete search history.

(56) References Cited

U.S. PATENT DOCUMENTS

| | | |
|---|---|---|
| 4,936,780 A | 6/1990 | Cogliano |
| 5,275,567 A | 1/1994 | Whitfield |
| 2002/0090596 A1 | 7/2002 | Sosoka et al. |
| 2002/0160342 A1 | 10/2002 | Castro |
| 2003/0148700 A1 | 8/2003 | Arlinsky et al. |

(Continued)

FOREIGN PATENT DOCUMENTS

| | | |
|---|---|---|
| CN | 201181529 Y | 1/2009 |
| EP | 0 471 572 A1 | 2/1992 |

(Continued)

OTHER PUBLICATIONS

"Precalculus", Seventh Edition; Ron Larson, Robert Hostetler; Copyright © 2007 by Houghton Mifflin Company; The total number of pertinent pages attached is 5.*

(Continued)

*Primary Examiner* — Bruk A Gebremichael
(74) *Attorney, Agent, or Firm* — Nath, Goldberg & Meyer; Richard C. Litman (57) ABSTRACT

The interactive Arabic alphabet blocks is a set of blocks for teaching children Arabic letters. Each block interacts with a touch screen to teach the symbol of a letter and its pronunciation. Each interactive Arabic alphabet block includes a front face having an Arabic letter painted and/or engraved thereon. The bottom face of the blocks includes a plurality of raised nubs thereon. The nubs and all faces of the blocks are covered with a conductive mesh or paint. The nubs represent the start and stop locations of each stroke of forming the Arabic letter. When the block is placed on a touch screen of a mobile electronic device, an application on the device detects the nubs and identifies the Arabic letter associated with the location of the nubs. The Arabic letter identified is displayed on the device's screen and played by the device's speaker or headphones.

7 Claims, 6 Drawing Sheets

(56) References Cited

U.S. PATENT DOCUMENTS

| | | | |
|---|---|---|---|
| 2004/0248650 A1* | 12/2004 | Colbert | ............... A63F 3/00643 |
| | | | 463/37 |
| 2014/0168094 A1* | 6/2014 | Milne | .................... G09B 19/02 |
| | | | 345/173 |
| 2017/0061824 A1 | 3/2017 | Kernan | |
| 2017/0296938 A1 | 10/2017 | Dawes | |

FOREIGN PATENT DOCUMENTS

| | | |
|---|---|---|
| KR | 20110004549 A | 1/2011 |
| KR | 101077926 B1 | 10/2011 |

OTHER PUBLICATIONS

"Smart 'Lego' blocks take touch screens into 3D," © Copyright New Scientist Ltd. website, Oct. 6, 2009, https://www.newscientist.com/article/dn17919-smart-lego-blocks-take-touch-screens-into-3d/.

"AlphaTechBlocks: Physical blocks playing in a digital world," Kickstarter, PBC website, © 2018, https://www.kickstarter.com/projects/lulumiami/alphatechblocks-physical-blocks-playing-in-a-digit.

* cited by examiner

INTERACTIVE ARABIC ALPHABET BLOCKS

BACKGROUND

1. Field

The disclosure of the present patent application relates to educational toys, and particularly to interactive Arabic alphabet blocks that may be used for teaching the Arabic alphabet to infants and toddlers.

2. Description of the Related Art

Alphabet blocks have been used to introduce infants and toddlers to written languages for many years. Conventional alphabet blocks are generally made of wood with painted and/or engraved images of the letters of a particular language. More sophisticated blocks have been developed, some of which interact with touch screens, others of which have integral audio systems for pronouncing letters associated with the blocks. More modern methods of teaching letters and their pronunciation include applications (software) that are operated on computers or mobile electronic devices, such as laptops, tablets and smart phones. While all of the above described devices are useful in teaching language to infants and toddlers, they lack the ability to teach more than the letter and its pronunciation.

Thus, interactive Arabic alphabet blocks for teaching the Arabic alphabet solving the aforementioned problems is desired.

SUMMARY

The interactive Arabic alphabet blocks is a set of blocks for teaching children Arabic letters. The blocks interact with a capacitive touch screen to teach the symbol of a letter, its pronunciation, and its stroke(s) start and end positions. Each block includes a front face having an Arabic letter painted and/or engraved thereon. The bottom face of each block includes a plurality (two to four) of raised portions or nubs thereon. Each block also includes a top face, a left side face, a back face and a right side face, and in the preferred embodiment, forms a cube with all edges being equal in length. The nubs and all faces of the blocks are covered with a conductive mesh or paint. The nubs represent the start and stop locations of each stroke of forming the Arabic letter displayed on the front face. When a child (or other) places the block on a capacitive touch screen of a mobile electronic device, a software application (app) on the device reads the nubs and identifies the Arabic letter associated with the location of the nubs by calculating the average distance between all nubs. The Arabic letter identified is displayed on the device's screen, and the sound of the letter is emitted by the device's speaker (or headphones, if used).

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
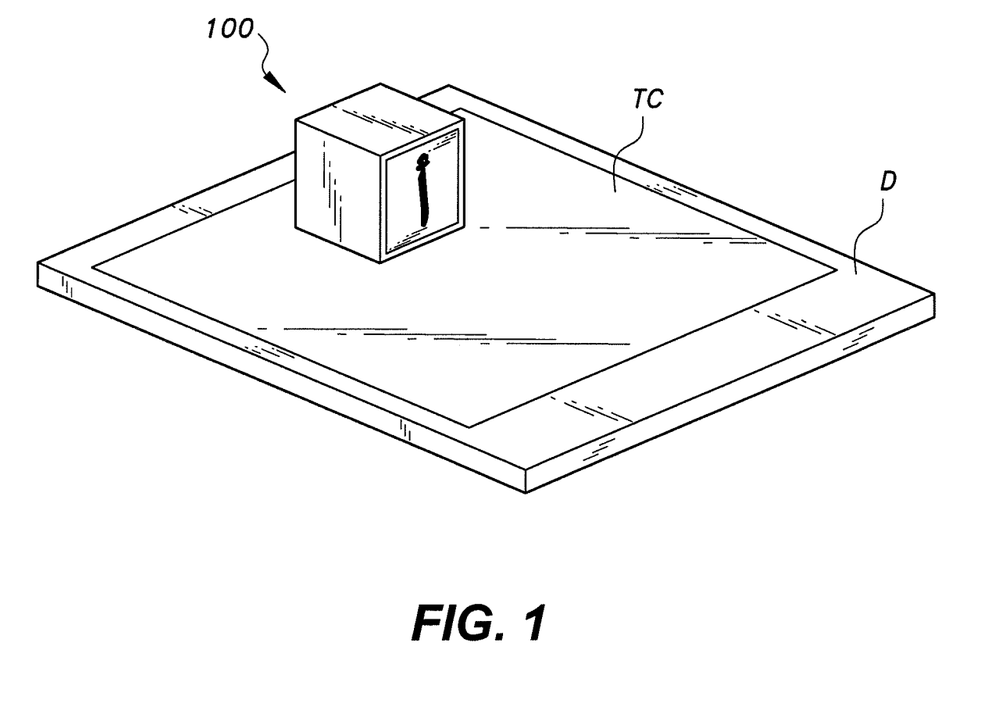
FIG. 1 is an environmental, perspective view of a first embodiment of an interactive Arabic alphabet block, showing the block placed on the capacitive touch screen of a portable electronic device.
Figure 2:
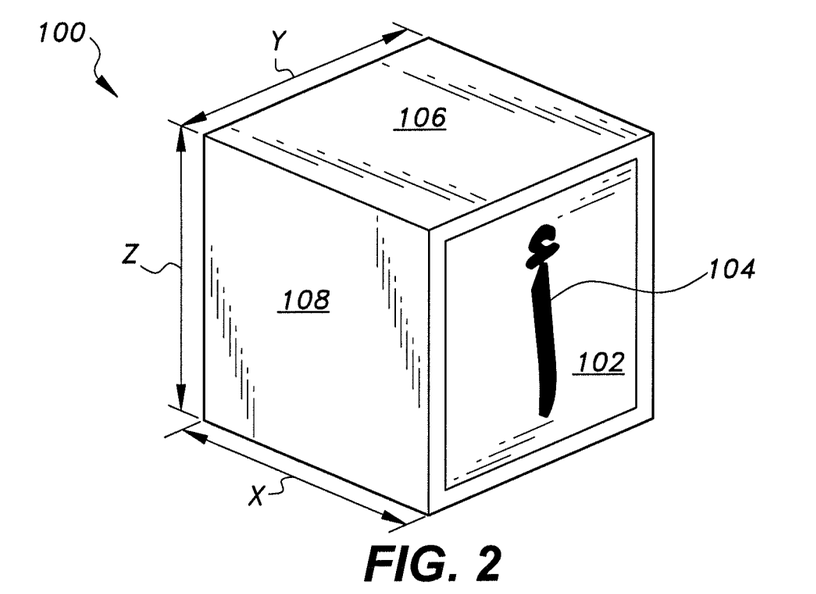
FIG. 2 is a perspective view of the interactive Arabic alphabet block of FIG. 1, showing the front face, the top face and the left side face, thereof.
Figure 3:
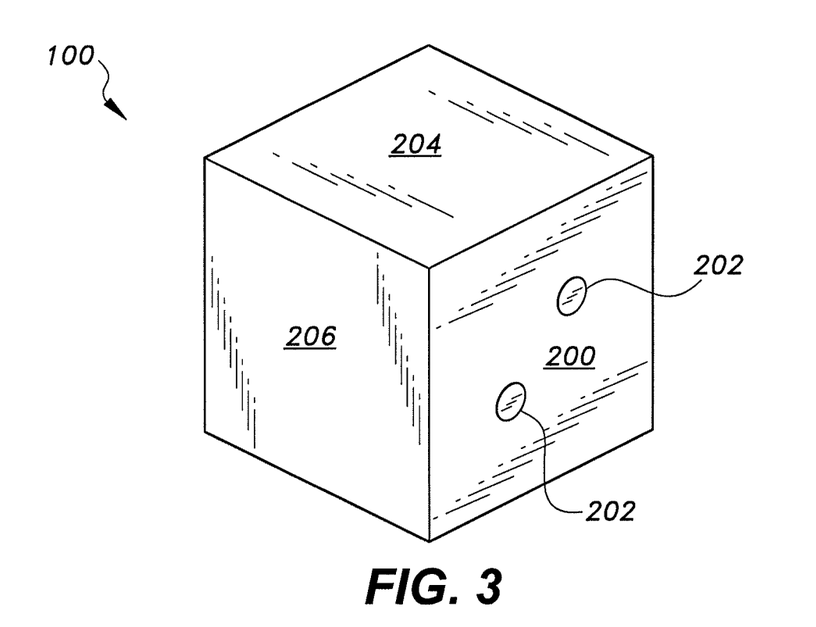
FIG. 3 is a perspective view of the interactive Arabic alphabet block of FIG. 1, showing the bottom face, the back face and the right side face, thereof.

FIG. 1 shows a first embodiment of an interactive Arabic alphabet block 100 placed on the capacitive touch screen TC of a portable electronic device D. With reference to FIGS. 2 and 3, the interactive Arabic alphabet block 100, includes a front face 102, a top face 106, a left side face 108, a bottom face 200, a back face 204 and a right side face 206. The front face 102 includes indicia depicting an Arabic letter 104, either painted thereon, engraved thereon, or both painted and engraved thereon. The bottom face 200 includes a plurality (two in this embodiment) of raised portions or nubs 202 thereon. The nubs are preferably 0.2 cm in diameter and have a height above the surface of the bottom face 200 of preferably 0.14 cm, although other sizes are possible. The locations of the raised nubs 202 correspond to the start and stop locations of the single stroke used to form the Arabic letter represented on the front face 102. While the alphabet blocks described herein are shown as cubes with a length equal to X, a width equal to Y, and a height equal to Z, wherein X=Y=Z, and having six planar square faces that are orthogonal to one another to form a cube, other shapes of the faces and numbers of faces are also possible. The minimum number of faces is four, in order to form a three dimensional block including the front face 102, the bottom face 200 and at least two other faces. As can be seen in FIGS. 2 and 3, the front face 102 and the bottom face 200 are preferably adjacent to each other.

All faces of the interactive Arabic alphabet block 100 are covered with a conductive mesh or paint. When a child (or other) places the interactive Arabic alphabet block 100 on the capacitive touch screen TC of a portable electronic device D with the bottom face 200 resting on the touch screen TC, as shown in FIG. 1, the raised nubs 202 are in contact with the capacitive touch screen TC. The conductive mesh electrically connects the hand of the child to the raised nubs 202, thereby activating those pixels contacted by the nubs 202 on the capacitive touch screen TC. A software application (app) executing on the processor of the device identifies the Arabic letter 104 associated with the location of the nubs in the manner described below with respect to FIGS. 4A-6B. The letter is then displayed on the capacitive touch screen TC of the device D, and the sound of the letter is emitted by the device's speaker (or headphones, if used).

Figure 4A:
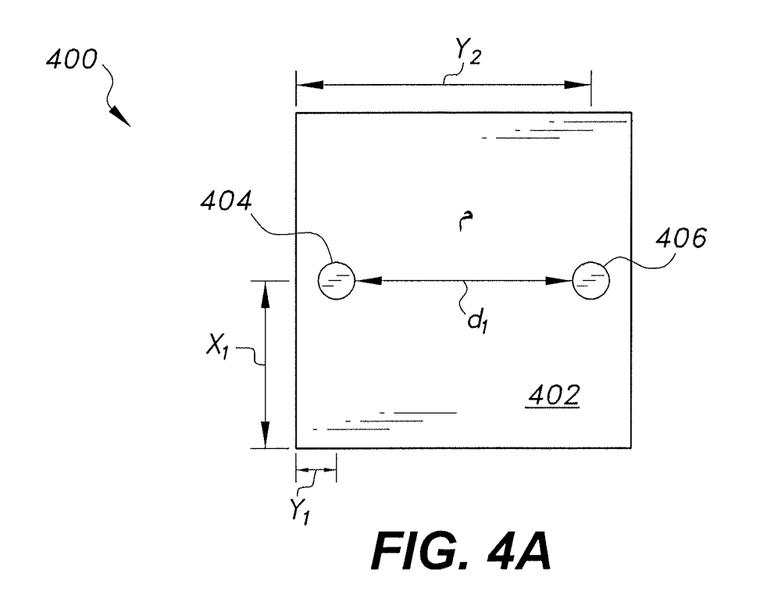
FIG. 4A is a bottom view of a second embodiment of an interactive Arabic alphabet block.

FIG. 4A is a bottom view of a second embodiment of an interactive Arabic alphabet block 400, showing the bottom face 402 of the block 400 with two raised nubs 404 and 406, for representing the Arabic letter ﺮ. Using Cartesian coordinates, the first raised nub 404 is located at $X_1$ and $Y_1$, while the second raised nub 406 is located at $X_1$ and $Y_2$, as measured from the lower left corner of the bottom face 402. The distance between the nubs 404 and 406 is $d_1$. The distance $d_1$ is equal to $\sqrt{((X_1-X_1)^2+(Y_1-Y_2)^2)}=\sqrt{(0+(Y_1-Y_2)^2)}=|Y_1-Y_2|$. This distance and the other distances described below represent the relative distance of the single (or multiple in other cases below) stroke required to draw the Arabic letter ﺮ. Obviously, this distance and the other distances described below depend on the size of the letter drawn. With respect to the interactive Arabic alphabet blocks described herein, this distance is unique for each block and as described below, this distance can be used to identify the block.

Figure 4B:
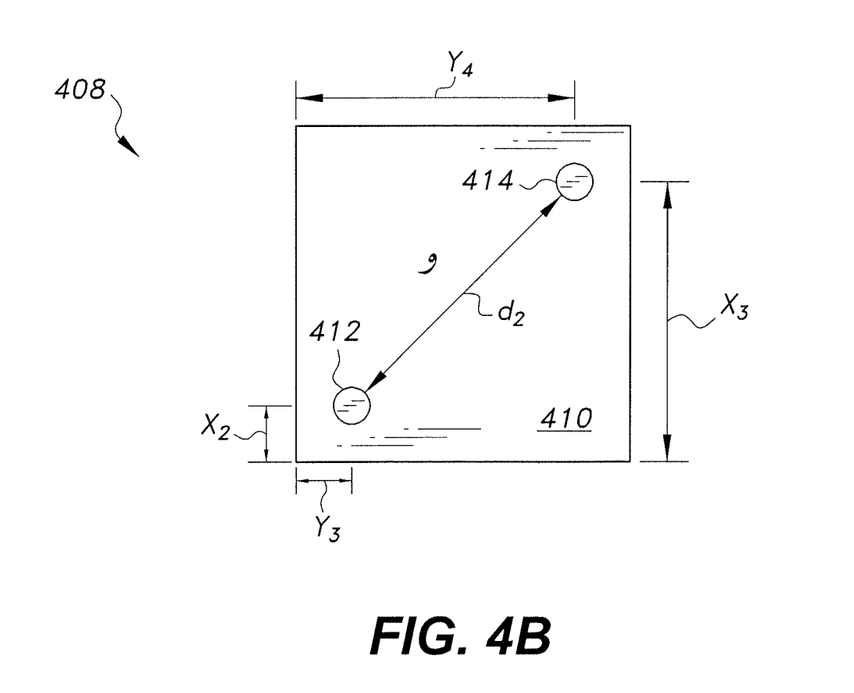
FIG. 4B is a bottom view of a third embodiment of an interactive Arabic alphabet block.

FIG. 4B is a bottom view of a third embodiment of an interactive Arabic alphabet block 408, showing the bottom face 410 of the block 408 with two raised nubs 412 and 414, for representing the Arabic letter ﻭ. The distance between the nubs 412 and 414 is $d_2$. The distance $d_2$ is equal to $\sqrt{((X_2-X_3)^2+(Y_3-Y_4)^2)}$.

Figure 5A:
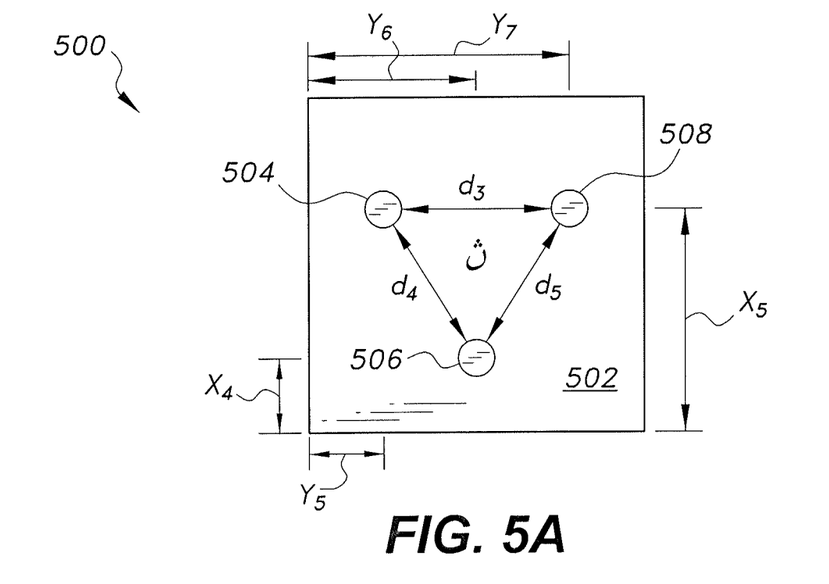
FIG. 5A is a bottom view of a fourth embodiment of an interactive Arabic alphabet block.

FIG. 5A is a bottom view of a fourth embodiment of an interactive Arabic alphabet block 500, showing the bottom face 502 of the block 500 with three raised portions 504, 506 and 508, for representing the Arabic letter ﺏ. The distance between the nubs 504 and 508 is $d_3$. The distance $d_3$ is equal to $\sqrt{((X_5-X_5)^2+(Y_5-Y_7)^2)}=\sqrt{(0+(Y_5-Y_7)^2)}=|Y_5-Y_7|$. The distance between the nubs 504 and 506 is $d_4$. The distance $d_4$ is equal to $\sqrt{((X_4-X_5)^2+(Y_5-Y_6)^2)}$. The distance between the nubs 506 and 508 is $d_5$. The distance $d_5$ is equal to $\sqrt{((X_4-X_5)^2+(Y_6-Y_7)^2)}$. To represent block 500 with a single distance, the average distance is calculated. This average distance for block 500 is therefore $(d_3+d_4+d_5)/3$.

Figure 5B:
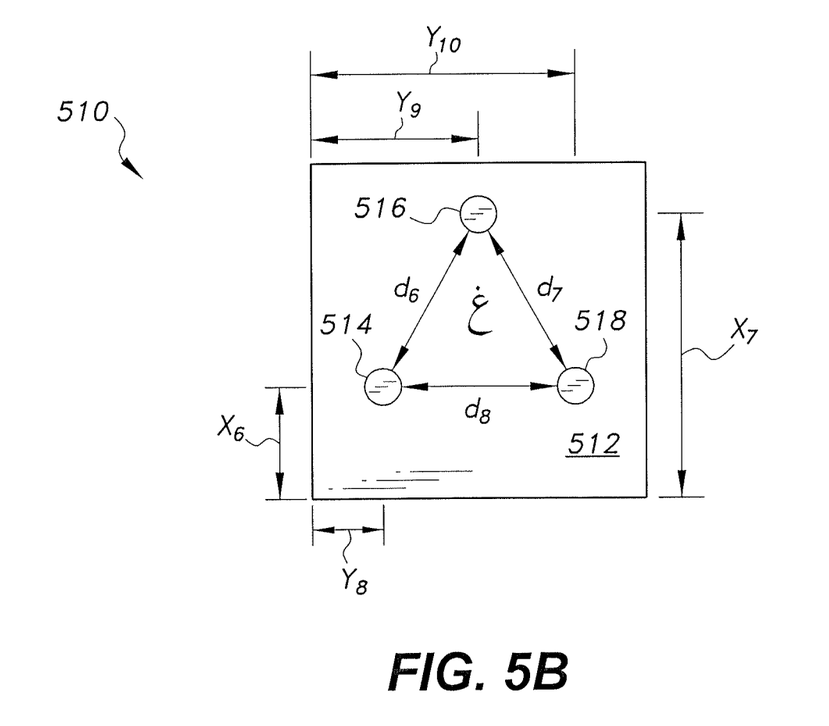
FIG. 5B is a bottom view of a fifth embodiment of an interactive Arabic alphabet block 510.

FIG. 5B is a bottom view of a fifth embodiment of an interactive Arabic alphabet block 510, showing the bottom face 512 of the block 510 with three raised portions 514, 516 and 518, for representing the Arabic letter ﻉ. The distance between the nubs 514 and 516 is $d_6$. The distance $d_6$ is equal to $\sqrt{((X_6-X_7)^2+(Y_8-Y_9)^2)}$. The distance between the nubs 516 and 518 is $d_7$. The distance $d_7$ is equal to $\sqrt{((X_6-X_7)^2+(Y_9-Y_{10})^2)}$. The distance between the nubs 514 and 518 is $d_8$. The distance $d_8$ is equal to $\sqrt{((X_6-X_6)^2+(Y_8-Y_{10})^2)}=\sqrt{(0+(Y_8-Y_{10})^2)}=|Y_8-Y_{10}|$. To represent block 510 with a single distance, the average distance is calculated. The average distance for block 510 is therefore $(d_6+d_7+d_8)/3$.

Figure 6A:
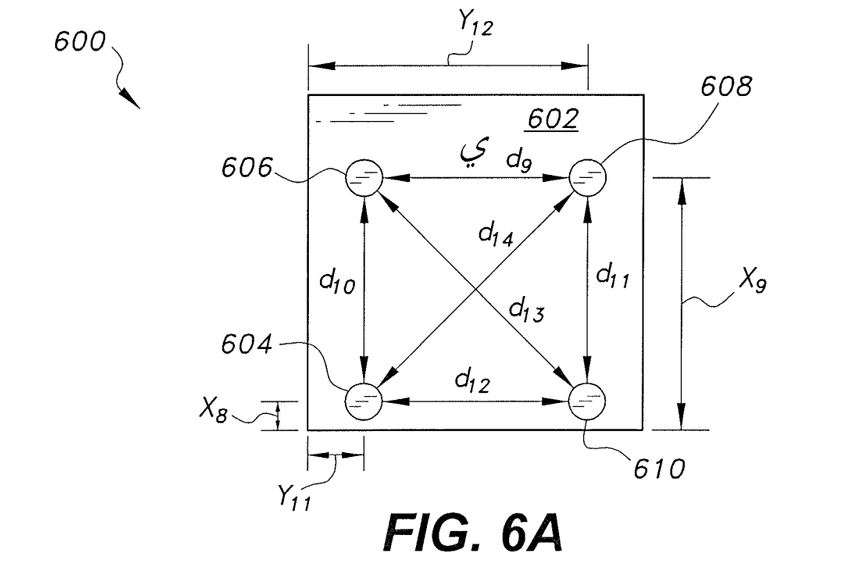
FIG. 6A is a bottom view of a sixth embodiment of an interactive Arabic alphabet block.

FIG. 6A is a bottom view of a sixth embodiment of an interactive Arabic alphabet block 600, showing the bottom face 602 of the block 600 with four raised portions 604, 606, 608 and 610, for representing the Arabic letter ﻱ. The distance between the nubs 604 and 606 is $d_{10}$. The distance $d_{10}$ is equal to $\sqrt{((X_8-X_9)^2+(Y_{11}-Y_{11})^2)}=\sqrt{((X_8-X_9)^2+0)}=|X_8-X_9|$. The distance between the nubs 606 and 608 is $d_9$. The distance $d_9$ is equal to $\sqrt{((X_9-X_9)^2+(Y_{11}-Y_{12})^2)}=\sqrt{(0+(Y_{11}-Y_{12})^2)}=|Y_{11}-Y_{12}|$. The distance between the nubs 608 and 610 is $d_{11}$. The distance $d_{11}$ is equal to $\sqrt{((X_8-X_9)^2+(Y_{12}-Y_{12})^2)}=\sqrt{((X_8-X_9)^2+0)}=|X_8-X_9|$. The distance between the nubs 604 and 610 is $d_{12}$. The distance $d_{12}$ is equal to $\sqrt{((X_8-X_8)^2+(Y_{11}-Y_{12})^2)}=\sqrt{(0+(Y_{11}-Y_{12})^2)}=|Y_{11}-Y_{12}|$. The distance between the nubs 606 and 610 is $d_{13}$. The distance $d_{13}$ is equal to $\sqrt{((X_8-X_9)^2+(Y_{11}-Y_{12})^2)}$. The distance between the nubs 604 and 608 is $d_{14}$. The distance $d_{14}$ is also equal to $\sqrt{((X_8-X_9)^2+(Y_{11}-Y_{12})^2)}$. To represent block 600 with a single distance, the average distance is calculated. The average distance for block 600 is therefore $(d_9+d_{10}+d_{11}+d_{12}+d_{13}+d_{14})/6$.

Figure 6B:
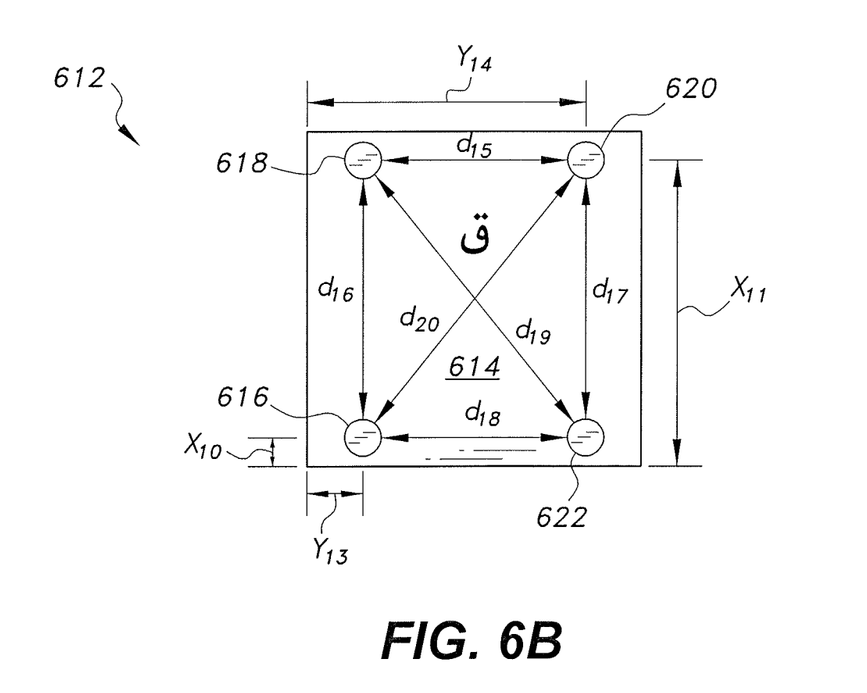
FIG. 6B is a bottom view of a seventh embodiment of an interactive Arabic alphabet block.

FIG. 6B is a bottom view of a seventh embodiment of an interactive Arabic alphabet block 612, showing the bottom face 614 of the block 612 with four raised portions 616, 618, 620 and 622, for representing the Arabic letter ﻕ. The distance between the nubs 616 and 618 is $d_{16}$. The distance $d_{16}$ is equal to $\sqrt{((X_{10}-X_{11})^2+(Y_{13}-Y_{13})^2)}=\sqrt{((X_{10}-X_{11})^2+0)}=|X_{10}-X_{11}|$. The distance between the nubs 618 and 620 is $d_{15}$. The distance $d_{15}$ is equal to $\sqrt{((X_{11}-X_{11})^2+(Y_{13}-Y_{14})^2)}=\sqrt{(0+(Y_{13}-Y_{14})^2)}=|Y_{13}-Y_{14}|$. The distance between the nubs 620 and 622 is $d_{17}$. The distance $d_{17}$ is equal to $\sqrt{((X_{10}-X_{11})^2+(Y_{14}-Y_{14})^2)}=\sqrt{((X_{10}-X_{11})^2+0)}=|X_{10}-X_{11}|$. The distance between the nubs 616 and 622 is $d_{18}$. The distance $d_{18}$ is equal to $\sqrt{((X_{10}-X_{10})^2+(Y_{13}-Y_{14})^2)}=\sqrt{(0+(Y_{13}-Y_{14})^2)}=|Y_{13}-Y_{14}|$. The distance between the nubs 618 and 622 is $d_{19}$. The distance $d_{19}$ is equal to $\sqrt{((X_{10}-X_{11})^2+(Y_{13}-Y_{14})^2)}$. The distance between the nubs 616 and 620 is $d_{20}$. The distance $d_{20}$ is also equal to $\sqrt{((X_{10}-X_{11})^2+(Y_{13}-Y_{14})^2)}$. To represent block 612 with a single distance, the average distance is calculated. The average distance for block 612 is therefore $(d_{15}+d_{16}+d_{17}+d_{18}+d_{19}+d_{20})/6$.

Figure 7:
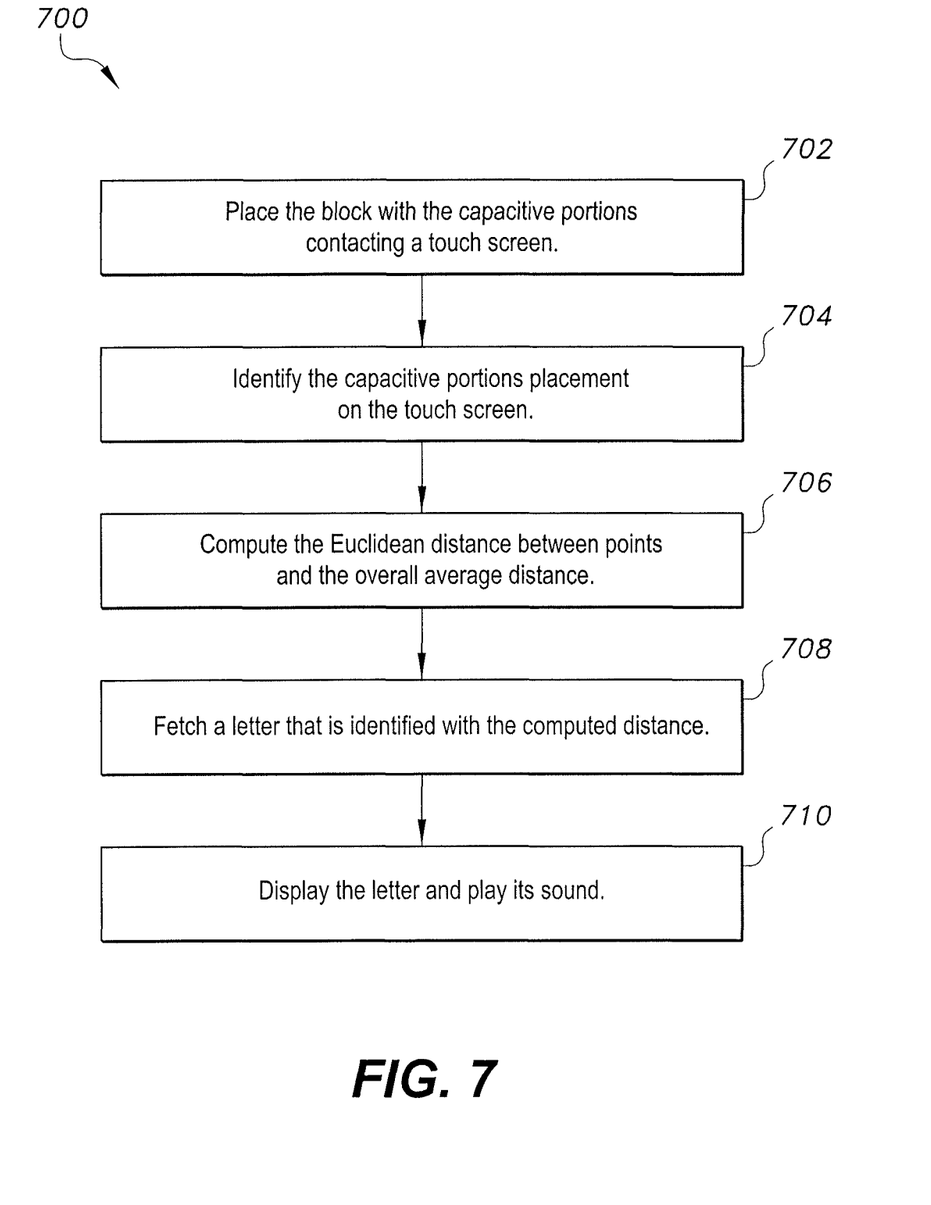
FIG. 7 is a flowchart showing a method of using the interactive Arabic alphabet blocks in conjunction with a capacitive touch screen.

FIG. 7 is a flowchart 700, showing a method of using the interactive Arabic alphabet blocks in conjunction with a capacitive touch screen to teach Arabic letters to children or others. In step 702 the block, e.g., block 100, is placed such that the capacitive portions (raised nubs 202) contact the capacitive touch screen TC, (see FIGS. 1 and 3). Note that the block 100 is just one example, and that the interactive Arabic alphabet block is a set of blocks representing all letters of the Arabic language. It is assumed in step 702 that the device D is on, and has the application (app) installed in its memory and is activated. In step 704, the app identifies the locations (points) where the capacitive portions (nubs) of the block contact the capacitive touch screen. It is important to note that the entire outer surface of the blocks are covered in a conductive mesh or paint, so that the hand of a child (or other user) is electrically connected to the capacitive portions, thereby increasing their ability to be sensed by the capacitive touch screen TC. In step 706 the Euclidean distance between the points and/or the average distance between the points is computed, as described above. When there are only two raised nubs, (see FIGS. 4A and 4B), the single distance is also the average distance. When there are multiple raised nubs (FIGS. 5A, 5B, 6A and 6B), then the distances are averaged as described above.

In step 708, the letter that is identified with the computed distance is fetched, for example, from a look-up table. Each block is designed such that the raised nubs represent the start and end locations of each stroke of forming the particular Arabic letter represented on the block. A single stroke is defined as being between a first point where the writing instrument is placed on the surface and a second point where it is raised from the surface. Arabic letters are formed using one, two or multiple strokes. Strokes can include simple singular curves, multiple curves or circled curves or teardrops. Each block is designed to have a specific average (or single) distance that the app identifies as the associated Arabic letter.

Once the Arabic letter is identified, in step 710 the letter is displayed on the capacitive touch screen TC of the device D, and the sound of the letter is played via the device's audio output device, which may be a speaker or headphones.

It is to be understood that the interactive Arabic alphabet blocks is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for teaching Arabic letters using interactive Arabic alphabet blocks in conjunction with a touch screen, comprising:
   a device comprising a capacitive touch screen, a processor and memory, the device including a software application that is stored in the memory of the device and executable on the processor configured to:
   i) detect the Arabic alphabet block placed on and interfacing with the capacitive touch screen;
   ii) determine the identity of the Arabic alphabet block;
   iii) select a program for display on the capacitive touch screen based on an identity of the Arabic alphabet block; and
   iv) display the selected program on the capacitive touchscreen;
   a set of interactive Arabic alphabet blocks for teaching Arabic letters, each of the blocks having a plurality of abutting outer surfaces to form the block, each of the outer surfaces of the blocks being entirely covered with a conductive material thereby enhancing their ability to be sensed when the block is placed and held on the capacitive touch screen, comprising:
   a) a first set of Arabic alphabet blocks defining single stroke letters, wherein each of the blocks has:
      i) a distinct single stroke Arabic letter indicia disposed on one of its outer surfaces; and
      ii) a distinct pattern of two raised nubs on another one of the outer surfaces, wherein the two raised nubs identify its corresponding single stroke Arabic letter, further wherein the two raised nubs having a surface configured to interact with the capacitive touch screen whereby the distinct Arabic letter is displayed;
   b) a second set of Arabic alphabet blocks defining double stroke letters, wherein each of the blocks has:
      i) a distinct double stroke Arabic letter indicia disposed on one of its outer surfaces; and
      ii) a distinct pattern of three raised nubs on another one of the outer surfaces, wherein the three raised nubs identify its corresponding double stroke Arabic letter, further wherein the three raised nubs having a surface configured to interact with the capacitive touch screen whereby the distinct Arabic letter is displayed;
   c) a third set of Arabic alphabet blocks defining multi-stroke letters, wherein the multi-stroke letters require greater than two strokes, further wherein each of the blocks has:
      i) a distinct multi-stroke Arabic letter indicia disposed on one of its outer surfaces; and
      ii) a distinct pattern of four raised nubs on another one of the outer surfaces, wherein the four raised nubs identify its corresponding multi-stroke Arabic letter, further wherein the four raised nubs having a surface configured to interact with the capacitive touch screen whereby the distinct Arabic letter is displayed.

2. The system for teaching Arabic letters using interactive Arabic alphabet blocks according to claim 1, wherein the distinct pattern for each of the blocks is based on computing the location of the raised nubs using the formula:
   $\sqrt{((X_i-X_j)^2+(Y_jY_z)^2)}$, wherein X and Y are Cartesian coordinates measured from a corner of a respective block, and i, j, and z are the actual measured coordinate points located on the block.

3. The system for teaching Arabic letters using interactive Arabic alphabet blocks according to claim 1, wherein the plurality of abutting outer surfaces form a cube.

4. The system for teaching Arabic letters using interactive Arabic alphabet blocks according to claim 1, wherein each of the distinct patterns represents the start and end locations of the strokes required to form the Arabic letter depicted on the block.

5. The system for teaching Arabic letters using interactive Arabic alphabet blocks according to claim 1, wherein the displayed Arabic letter includes an auditory output.

6. The system for teaching Arabic letters using interactive Arabic alphabet blocks according to claim 1, wherein the displayed Arabic letter includes visual output on the touch screen.

7. A method for teaching Arabic letters using interactive Arabic alphabet blocks in conjunction with a touch screen using the system according to claim 1, comprising the steps of:
   selecting one of the Arabic alphabet blocks; and
   placing the selected one Arabic alphabet block on the touch screen such that the raised nubs contact the touch screen, the touch screen sensing relative locations of the raised nubs on the touch screen, the software application recognizing the Arabic letter based on the relative locations and displaying the Arabic letter on the touch screen.

* * * * *